United States Patent [19]

Cantley

[11] 4,325,223
[45] Apr. 20, 1982

[54] ENERGY MANAGEMENT SYSTEM FOR REFRIGERATION SYSTEMS

[76] Inventor: Robert J. Cantley, 905 Versailles Ct., Maitland, Fla. 32751

[21] Appl. No.: 244,161

[22] Filed: Mar. 16, 1981

[51] Int. Cl.³ .......................... F25B 49/00; F25D 3/00
[52] U.S. Cl. ....................................... 62/126; 62/171; 62/475; 62/127
[58] Field of Search ...................... 62/176 C, 171, 126, 62/127, 475

[56] References Cited

U.S. PATENT DOCUMENTS

| | | | |
|---|---|---|---|
| 3,082,951 | 3/1963 | Kayan | 62/127 X |
| 3,481,152 | 12/1969 | Seeley | 62/183 X |
| 3,707,851 | 1/1973 | McAshan, Jr. | 62/129 |
| 4,038,061 | 7/1977 | Anderson et al. | 62/126 |
| 4,146,085 | 3/1979 | Wills | 62/127 X |
| 4,193,781 | 3/1980 | Vogel et al. | 62/181 X |

*Primary Examiner*—William E. Wayner
*Attorney, Agent, or Firm*—Macdonald J. Wiggins

[57] ABSTRACT

A system and method for managing energy in large refrigeration systems and the like by continuously monitoring operating parameters and controlling to optimize the refrigeration system elements. A multiplicity of remote sensors is disposed at the appropriate points in the refrigeration system to produce analog electrical signals representative of various temperatures such as wet bulb temperature, dry bulb temperature, condensing temperature, evaporator air temperature, evaporator refrigerant temperature, and similar temperatures, and various pressures such as head pressure, booster suction pressure, intermediate suction pressure, and the like. A signal processor is provided to receive signals from the sensors, to condition the analog signals, convert to digital signals and to feed a digital computer which has a memory for storing system design parameters and refrigerant characteristics. The digital computer calculates the instantaneous system operating parameters from the digital signals, compares these parameters to the design parameters, and operates control relays to load and unload compressors to maintain optimum system pressures, to energize and deenergize fans and pumps in accordance with the system requirements, and to produce alarms when non-condensible gases and/or fouled condensers are indicated in the refrigeration system. In systems subject to frost build up on the evaporator, defrost cycles are also controlled by the computer to occur only when necessary.

35 Claims, 9 Drawing Figures

ENERGY MANAGEMENT SYSTEM FOR REFRIGERATION SYSTEMS

BACKGROUND OF THE INVENTION

1. Field of the Invention

The present invention relates to an integrated energy management system for refrigeration systems and more particularly to a method and system for automatically controlling certain functions of a refrigeration system to minimize the energy costs and to provide the user with continuous data on parameters of the system.

2. Description of the Prior Art

Over the recent decades, the use of refrigeration systems and air conditioning systems has grown to the point that such systems represent a major consumer of electrical energy in the United States as well as in many of the major industrial nations of the world. The designs for such systems developed during a period when electrical energy was extremely cheap. Efficiency often was relegated to a secondary factor in such designs with the initial cost being a primary factor. However, in recent years, the shortages of fossil fuels for producing electrical energy and the continuing increase in demand for electrical energy has led to significant improvements in the design to minimize input power, both in the interest of conservation of energy and the reduction of operating costs.

As is well known, the price of electricity has continued to spiral upward to the point that operating costs may dominate over capital investment costs. This situation is particularly severe with respect to large industrial refrigeration systems, such as those having capacities from 100 tons to 1,000 tons and greater. To illustrate, a 1,000 ton refrigeration system, designed to the state of the art, may have an annual operating cost of over $400,000.00 for power at 5¢ kilowatt hour. This number assumes that the system is operating at its design parameters and that all of the components are operating at their maximum efficiencies.

What may not be generally realized is the penalty that the user must pay for naturally occuring deterioration of the elements of the system and for the changes in the operating environment which causes the operating parameters to depart from the original design parameters. To illustrate this problem, assume an ammonia compressive type refrigeration system having an evaporative condenser and the following design parameters:

| | |
|---|---|
| Average Load | 1000 Tons |
| Suction refrigerant temperature | 20° F. |
| Wet bulb temperature | 78° F. |
| Condensing temperature | 96.3° F. |
| Compressor motor efficiency | 0.92 |
| Condenser fan and water pump motor efficiency | 0.85 |
| Fan and water pump horsepower | 10% of tonnage load |

When this system is operating at its design parameters and at maximum efficiency, with a power cost of 5¢ kilowatt hour, the cost per ton of cooling may be calculated to be 4.5¢ per ton per hour which gives an annual operating cost of $394,200.00.

Two common problems that arise that will decrease the efficiency and therefore increase the operating costs are: build up of non-condensible gases in the system; and film fouling in the evaporative condensers. As is well known, either of these problems reduces the efficiency of the system. For example, a fouled condenser will result in an increase in condensing temperature and head pressure. Assuming that this change is from 96.3° F. to 101° F., it can be calculated that the costs per ton per hour will increase to 4.78¢ and the yearly cost to operate will increase to $418,728.00, which represents wasted power totalling $24,528.00. In this same system, for power costs of 7¢ per kilowatt hour, the wasted power would cost $34,339.00 if the conditions were allowed to continue for one year.

Similarly, if non-condensibles build up in the system the head pressure will increase for a given load. Assuming that the normal pressure for 96.3° F. condensing temperature to 185 psi increases to 201 psi due to non-condensible gases, the efficiency is decreased about 8% causing a yearly increase in power cost of $31,536.00.

It may be noted that in the example given, a condensing temperature of 96.3° F. will occur for ammonia at a head pressure of 185 psi under normal conditions. When the condensing temperature rose to 101.3° F. as assumed due to a fouled condenser, the head pressure would also go up proportionally. However, most systems in current operation provide the operator only with measurements of the head pressure and many plant operators depend upon such pressure readings to determine when certain preventive maintenance is required such as purging the system of non-condensible gases and cleaning of condensers. As will be shown in more detail later, to determine when condensers are fouled requires knowledge of the wet bulb temperature at the condenser and the condensing temperature of the refrigerant. Similarly, determination of the presence of non-condensible gases requires knowledge of the head pressure and the condensing temperature. As is well known, the head pressure and the condensing temperature can increase in synchronism in a system operating at its maximum efficiency due to an increased load. Similarly, when operating on a less than maximum load, the head pressure and condensing temperature will decrease proportionately. Thus, a head pressure reading alone cannot indicate a need for purging or for maintenance of the condenser. Consequently, many large systems may operate for an extended period of time with these problems remaining undetected and therefore waste power.

Another source of wasted energy in present systems stems from the problems of controlling the fans and water pumps associated with the condensers. For example, when the relative humidity is much lower than the utilized as a design parameter, it may not be necessary to operate the fans since natural evaporation may be sufficient. The important parameter here is the difference in temperature between the wet bulb reading and the condensing temperature referred to as $\Delta T_c$. For the design example given above with a wet bulb temperature of 78° F. and a condensing temperature of 96° F., the $\Delta T_c$ is equal to 18° F. Under conditions of much lower temperature than the average value for the location of the system utilized at design, the wet bulb temperature will go down. However, the control criteria should be $\Delta T$ and not an absolute measurement of pressure or humidity, since a higher condensing temperature will also increase $\Delta T_c$, but the wet bulb temperature remains constant. Similarly, if the load drops on the refrigeration system the cost to operate the compressors will drop proportionately but the condenser pumps and fans will remain operating at full load. Again, power may be wasted from this source.

When the outside air temperature is very low and at periods in which the water may freeze, the water pump motors may be cut off, saving energy. Again, the wet bulb and dry bulb temperatures must be known to determine when this can be done.

If a user of this type of refrigeration system can keep the system free of non-condensible gases, maintain the condenser at maximum efficiency, and control the running of the water pump motors and fan motors, the cost per ton per hour of the system can be prevented from increasing above its value predicted from the design and can in many instances be significantly reduced below that by taking advantage of favorable changes in ambient conditions and during periods of reduced load. These various problems have been recognized by those of skill in this art. For example, in the following U.S. patents, the head pressure has been used as an indicator of efficiency and apparatus provided sensitive to a measurement of the head pressure to effect certain system controls: Vogel, et al, U.S. Pat. No. 4,193,781; Seely, U.S. Pat. No. 3,481,152; and Wood, U.S. Pat. No. 3,196,629. Vogel has elected to prevent the system head pressure from going below a minimum for a particular operating mode. Wood is concerned with a refrigeration system using an air cooled condenser to maintain a desired head pressure to prevent the capacity of the system from being impaired during low outside ambient temperature conditions. Seely utilizes a plurality of condensers, switching the condensers on and off to maintain a desired head pressure. Therefore, these patents fall far short of the requirements delineated above. In U.S. Pat. No. 4,085,594 to Mayer, a control responsive to the temperature of the condensed refrigerant is disclosed to vary the speed of cooling tower fans so that the minimum power is required at all times. While possibly advantageous in a tower which simply cools the water, it does not take into account the relative humidity as is desirable in an evaporative condenser. McAshan, U.S. Pat. No. 3,707,851 measures the ambient air temperature in a refrigeration condenser and the temperature of the liquid refrigerant to produce an alarm when a malfunction in the system, fouled condenser, or the like occurs. Carroway, in U.S. Pat. No. 2,847,831, is concerned with controlling the operation of systems, including evaporative condensers, and recognizes the conditions under which the fan and/or pumps can be shut down. Various mechanical type pressure and temperature measuring elements are utilized, but he chooses to base his control on atmospheric air temperature rather than wet bulb temperature.

Automatic purge mechanisms are known in the art which will detect the presence of non-condensible gases in the system and will automatically vent these to the atmosphere. U.S. Pats. to Indis, et al, No. 3,013,404 and to Kieme, No. 2,598,799, are examples. However, automatic purging in an ammonia system which results in loss of refrigerant causes safety problems. It is thus preferable to require purging to be done manually under controlled conditions. When non-condensibles are due to leaks, the automatic purgers may not operate fast enough and therefore are not satisfactory. Other patents have provided various display and diagnostic aids to assist the operator in locating malfunctions in a system. These include Anderson, et al., U.S. Pat. No. 4,038,061 and Wills, U.S. Pat. Nos. 4,146,085. Schulze, Sr., in U.S. Pat. No. 4,186,563, discloses a display of energy use. Kayan, in U.S. Pat. No. 3,082,951, discloses methods of calculating the performance of a refrigeration system from system measurements.

Although some of the energy efficiency factors discussed above have been attacked individually by workers in this art, there has been no known modern and efficient energy management system available which can provide certain automatic controls responsive to measured values of specific system parameters, and which also provides readouts to the operator or alarms alerting the operator to perform certain manual maintenance actions.

SUMMARY OF THE INVENTION

My invention is an energy management system for large refrigeration systems which generally have one or more evaporative condensers. This system comprises four basic elements. First, a plurality of sensors is provided which sense various system pressures and system temperatures at the appropriate points. The system is adaptable to being installed in an existing refrigeration system and may, of course, be an integral part of a new installation. The pressure and temperature sensors are of the electrical type and I prefer types which can be utilized with relatively long leads to permit location of each sensor at a convenient location.

Second, the sensing elements are connected to a microcomputer system which includes signal processing circuits and analog-to-digital converters which produce digital output signals from the various analog parameter measurements from the sensors.

Third, a programmable memory system is provided and is programmed with the various design parameters of the refrigeration system into which the energy management system is installed. The computer is programmed to scan the various sensor inputs and to store the readings of each input. The computer calculates a number of measures of system performance by various algorithms and the measures are compared to the various stored parameters. Numerical readouts are then provided for various parameters which are of significance to the operator.

Fourth, the computer includes an interface unit which is connected into the refrigeration system such that control of certain components of the refrigeration system may be effected as required by the system conditions. A printer is included which will periodically print out status reports for the system. Alarm signals are provided which, if certain faults occur in the refrigeration system which would decrease its efficiency, alerts the operator to take maintenance actions.

Discussing my invention as applied to a two-stage refrigeration system having a set of main compressors, a set of evaporative condensers, an intercooler, evaporators, and booster compressors, the specific measurements and control action will be described. The evaporative condensers utilize water pumps which serve to spray water over the condensing coils to maintain a film of water on the coils by which latent heat is absorbed during evaporation. The unevaporated water is collected at the base of the condenser and recirculated by the pump. Fans are provided to cause a flow of air through the condensers to carry away the heated vapor and to thus eventually transfer the removed heat to the atmosphere. I provide two temperature sensors associated with the condensers. One sensor responds to the temperature of the outside ambient air referred to as the dry bulb temperature, and the second sensor is installed in the water flow path and measures what is referred to as the wet bulb temperature. Thus, the computer is provided with the necessary input measurements to be able to calculate the relative humidity from the wet and dry bulb readings. In a system having multiple condensers, a wet bulb sensor would be provided for each condenser.

A key system parameter is the condensing temperature and accordingly I provide a temperature sensor immersed in the liquid refrigerant flowing from the condensers to the receiver. An evaporator is in the area to be cooled by the refrigeration system and I provide temperature sensors to monitor the air temperature in the evaporator and the temperature of the vaporized refrigerant at that point.

The compressor discharge or head temperature is measured in my system between the condensers and the receiver. This location takes into account the pressure drop across the condensers. The input pressure or compressor suction is measured by a pressure transducer installed between the intercooler and the main compressors. The pressure between the evaporator and the booster compressor, termed the booster suction, is measured by a transducer installed at that point.

The computer includes a display board which provides a display of the following:
1. Wet bulb temperature, $T_{wb}$.
2. Ambient temperature, $T_{db}$.
3. Percent humidity.
4. Percent system efficiency.
5. Compressor suction $T_s$.
6. Compressor discharge or head pressure, $T_h$.
7. Cost per ton per hour.
8. Fouled condenser alarm.
9. Non-condensible gases alarm.
10. Status of the system control outputs.

The system control status indicators show which of the various controlled devices are on or off. Typical of such status indications are:
1. Condensers and indicating
    (a) Fans off or on,
    (b) Pumps off or on.
2. Main compressor loading and indicating compressors on or off line.
3. Booster compressor loading and indicating compressors on or off line.
4. Defrost system off or on.

Temperature and pressure sensor data from the refrigeration system are applied to conditioning circuitry which filters, amplifies and scales the measured parameters. The microcomputer is under software control which causes it to scan the input sensors one at a time. After selecting a sensor signal for its input, the computer receives a binary number equivalent to the value of the data at that time from the A/D converter. After a scan of all the input sensors is accomplished, the stored digitized data have conversion algorithms applied thereto and the various calculations performed. The parameters to be displayed are converted to an equivalent binary coded decimal format for operation of the front panel displays. The interface unit includes solid state control relays which are activated or deactivated according to results of analysis of the data. The computer may also be programmed to produce trend analysis, and a summary of the data trend and control information may be printed out on the printer at selected intervals.

When the evaporative condensers of the system are mounted outside, there is danger of damage to the water pumps and associated elements due to freezing. The computer will operate the appropriate control relays to cut the water pumps off when the wet bulb temperatures are found to be freezing or below. Similarly, during cold ambient conditions, water is not necessary for operation of the condenser as it will then operate as an air cooled condenser. Thus, by monitoring the ambient air temperature, the head pressure and the refrigerant pressure, the computer may determine when water pumps can be deenergized to save energy. The computer also utilizes the signals from the wet and dry bulb sensors to perform the relative humidity calculation for display.

As previously discussed, in a refrigeration system in which all of the components are in good operating condition, the condensing temperatures and the head pressure will have the values found in the condensing temperature versus head pressure charts for the particular refrigerant in use. When the load on the refrigeration system changes, the condensing temperature and the head pressure will change; however, such changes will follow the relationships indicated in the tables. Any deviation between the normal condensing temperature and the head pressure will indicate a problem in the system and will indicate a reduction in efficiency. The programmable memory in the computer will have the characteristics of the refrigerant in use and the design wet bulb and dry bulb temperatures appropriately stored. The computer will then compare the condensing temperature and the head pressure at each measurement time. If a deviation is noted from the stored values and the wet bulb temperature has not changed to a new standard value, an appropriate alarm will be energized. For example, if the head pressure and the condensing temperature are excessive coupled with an increase in wet bulb temperature, this condition indicates condenser fouling and the condenser fouling alarm can be set. I prefer a relative low threshold such that the condensers can be cleaned before excessive fouling can take place. Thus, it is not necessary for the operator to wait until serious fouling has occurred before he knows to accomplish this preventive maintenance.

Similarly, if the head pressure increases while the condensing temperature remains normal, the non-condensible gas alarm will be energized. Again, any desired threshold for this alarm may be programmed into the computer. When this alarm occurs, the operator may then bleed or purge the system. As is well known, air and oil vapor are the most common non-condensible gases encountered and generally enter the refrigerant lines from the compressors.

As the computer calculates the relative humidity from the wet bulb and dry bulb data, it effectively calculates the efficiency gained from the evaporative effect of the water compared to the energy required by the fans. When this is less then the fan energy, the computer operates the control relays to turn the fans off. The fan may also be deenergized when the relative humidity is so low that air flow from the fans is not necessary. The efficiency of the condenser is determined by the $\Delta T_c$ or difference between the wet bulb temperature and the condensing temperature. $\Delta T_c$ will change with the variations in load on the refrigeration system in a known manner when compared with the head pressure. When such changes do not track, as in a case in which $\Delta T_c$ is reduced yet the head pressure remains normal and the wet bulb remains normal, but an increase in the condensing temperature occurs, condenser fouling is indicated.

An overall efficiency of the refrigeration system may be determined by comparing the head pressure to the suction pressure. From stored data in the programmable memory, such as cost of power and the power consumption of the compressors and motors, the computer calculates the cost to operate per ton per hour and displays this information for the operator to thereby give an overall system efficiency indication.

Another important function of my control system is to minimize the cost of operation of the fans in the evaporator that move air from the controlled space across the evaporator coils and the suction or intermediate refrigerant pressures. In prior art systems, fouling of the evaporator coils due to ice or frost build-up is controlled by a timing cycle which periodically bypasses the refrigerant around the evaporator and defrosts by directing hot gas from the receiver through the evaporator. This method is very inefficient since it may attempt to defrost when not needed and delay defrosting when actually required. Advantageously, I utilize the measurements of evaporator air temperature and evaporator refrigerant temperature to automatically defrost whenever sufficient frost build-up occurs to reduce cooling efficiency. The difference between the refrigerant temperature $T_r$ and the air temperature $T_a$ (referred to as $\Delta T_e$) is utilized to effect defrost control. When $\Delta T_e$ becomes greater than the design value for the maximum cooling load, fouled evaporator coils are indicated and a defrost cycle is instituted.

The measurements of $\Delta T_e$ also yields significant power savings during light load conditions, such as at night and on weekends when the cooled space is not entered and the materials being cooled have attained equilibrium. This condition results in a $\Delta T_e$ lower than maximum load. Thus, evaporator fans may cut off and on during periods of low $\Delta T_e$ with a resultant savings in power. For example, in a cold storage system having a $-30°$ F. $T_a$ requirement for a $-40°$ $T_r$($10°$ F. $\Delta T_e$), and 100 HP evaporator fans, assume that the fans are cut off for $\Delta T_e = 5°$ F. and will be shut down one-half of the time during a weekend. For power costs of five cents per kwh, a savings of about $8,660.00 would be realized.

For convenience, the following is a list of symbology used herein:

| Pressures | |
|---|---|
| $P_h$ | main compressor discharge pressure at receiver input. |
| $P_{ms}$, $P_s$ | main compressor suction pressure. |
| $P_{bs}$ | booster compressor suction pressure. |
| Temperatures | |
| $T_{db}$ | dry bulb or outside ambient temperature. |
| $T_{wb}$ | wet bulb or evaporative temperature in condensers. |
| $T_c$ | condensing temperature of refrigerant at receiver input. |
| $\Delta T_e$ | $T_a - T_r$ |
| $\Delta T_c$ | $T_c - T_{wb}$ |
| $T_r$ | refrigerant temperature at evaporator input. |
| $T_a$ | air flowing across evaporator temperature. |

It is therefore a principle object of my invention to provide an energy management system which can be connected to refrigeration systems and the like which will control the operation thereof continuously and automatically to optimize the performance and to minimize the operating costs.

It is another object of my invention to provide an energy management system for large refrigeration systems which will provide the operator with constant monitoring of all parameters defined in the design of the refrigeration system as well as efficiency and costs to operate.

It is yet another object of my invention to provide an energy management system for large refrigeration systems which will provide visual and audible alarms for certain conditions which reduce the efficiency of the refrigeration system.

It is still another object of my invention to provide an energy management system having a multiplicity of temperature and pressure transducers that can be installed at key points in the refrigeration system and an electronic system for receiving electrical signals from the transducers for monitoring all of the key operating parameters.

It is a further object of my invention to provide an energy management system in which an electronic control system evaluates key system parameters, performs continuous calculations of factors defining the operating efficiency of the system, and automatically controls various components in the refrigeration system so as to optimize the operation of the refrigeration system with respect to operating costs.

It is yet a further object of my invention to disclose a method of monitoring and controlling large refrigeration systems to minimize the operation costs thereof.

These and other objects and advantages of my invention will become apparent from the following detailed description and the drawings.

DETAILED DESCRIPTION OF THE PREFERRED EMBODIMENT

Figure 1:
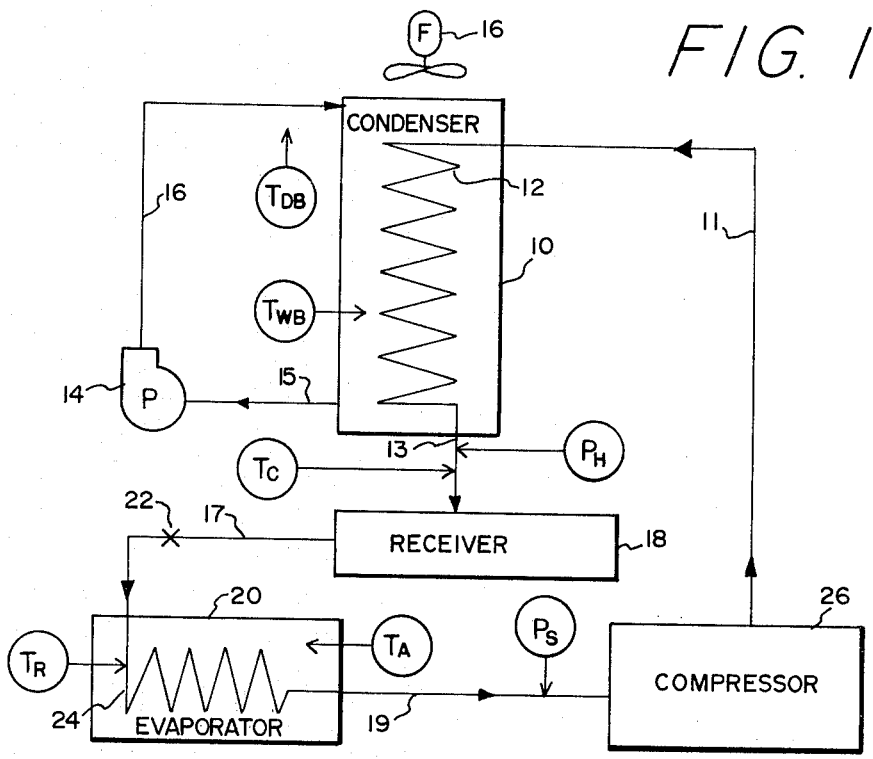
FIG. 1 is a simplified schematic diagram of a single stage refrigeration system showing points of parameter measurement.

Referring to FIG. 1 of the drawings, a schematic diagram of a single stage refrigeration system having an evaporative type condenser is shown. The system consists basically of the evaporative condenser 10 having a coil 12 for receiving the refrigerant in its gaseous state under pressure from compressor 26 via line 11. Water is drawn from a sump via line 15 by pump 14 and introduced at the top of the condenser via line 16. The water is generally sprayed over the coils 12 such that a film of water on the outside of the coils will be evaporated removing heat to condense the gaseous refrigerant to its liquid state. A fan 16 operates to move air across the coils to carry away the latent heat produced. The condensed refrigerant is collected in receiver 18 via line 13 from which it flows under pressure via line 17 to expansion valve 22. It is, of course, to be understood that some refrigeration systems of this type utilize other means for producing expansion of the liquid refrigerant. The liquid refrigerant expands in the evaporator 20 as it changes to its gaseous state and absorbs heat from the ambient air moving through the evaporator. From the evaporator coil 24, the gaseous refrigerant is drawn via line 19 into compressor 26 which compresses the gas and causes it to flow back to the condenser.

My invention comprises an energy management system which may be connected to a refrigeration system such as that shown in FIG. 1. My system will monitor and measure certain critical parameters of the refrigeration system such as at the points indicated in FIG. 1. For example, a measurement of the wet bulb temperature $T_{wb}$ is provided by a sensor bulb installed in the condenser such that the water spray produces a film on the sensor bulb which will be subject to the evaporative effect of the air moving through the condenser. Therefore, the wet bulb sensor will be at a temperature lower than ambient due to the heat lost in vaporization of the water and will be indicative of the operation of the condensing coil 12. A temperature sensor outside the condenser measures the ambient air temperature referred to as the dry bulb temperature $T_{db}$. As is well known, the relative humidity in the condenser may be determined from the difference between the wet bulb temperature and the dry bulb temperature. The humidity, of course, will affect the efficiency of the condenser since a very high humidity will result in much slower evaporation of the water and a very low humidity will result in rapid evaporation of the water. It is pertinent to note that a custom refrigeration system is usually designed for a particular geographical region in which it is to be used. The design will take into account the average relative humidity of the region but which will vary from season to season. Thus, the condenser must be of sufficient size to operate properly at the expected extremes. Many refrigeration systems will use multiple condensers such that the amount of condensing surface can be increased at times of very high humidity and decreased at times of low relative humidity by cutting condensing units in and out.

Two important parameters that provide information as to the efficiency of the refrigeration system are the compressor discharge pressure or head pressure $P_h$, and the temperature of the condensed refrigerant which flows into receiver 18, $T_c$. Measurements of these parameters taken on line 13 from condenser 10 to receiver 18 will therefore provide important operating information. An additional pressure reading which, when combined with the head pressure $P_h$, will indicate the efficiency of the compressor is the suction pressure $P_s$ at the input to the compressor 26 measured on line 19.

My system may also require measurements of the refrigerant temperature in the evaporator coil 24 and the temperature of the air flow through the evaporator $T_a$. Although I have shown in FIG. 1 the main parameter measurements required for operation of my energy management system, certain other measurements may be made for special purposes as will be discussed more fully below.

Figure 2:
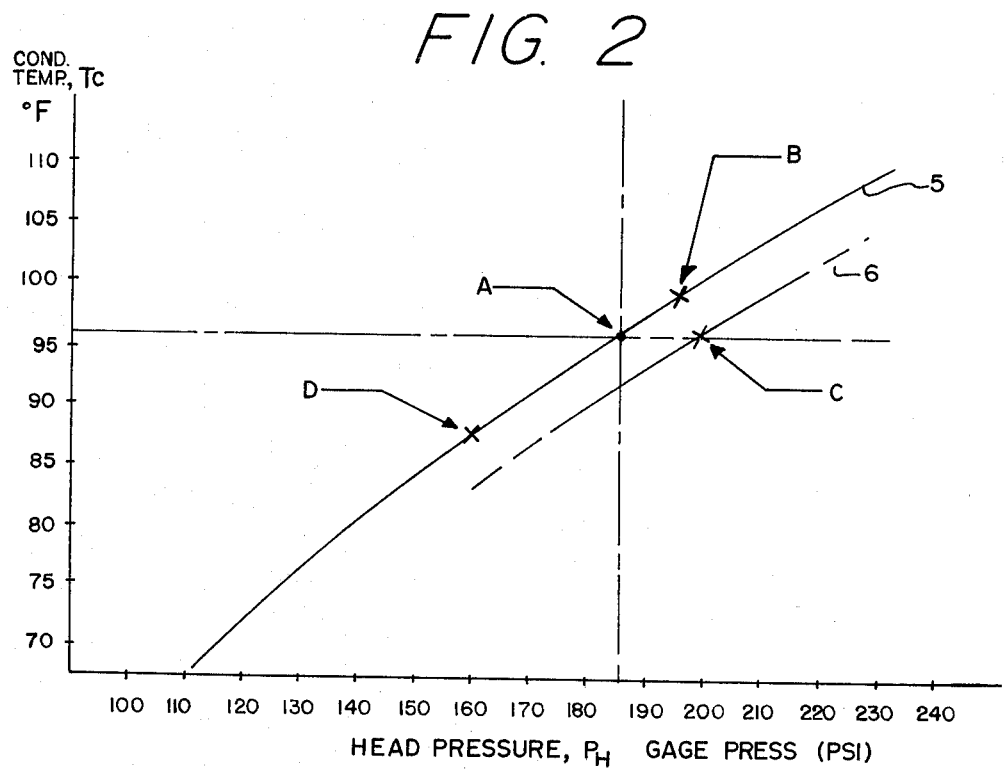
FIG. 2 is a graph of ammonia pressure versus condensing temperatures.

Before describing the preferred embodiment of my invention, it is pertinent to discuss briefly the significance of certain variations in the pressure and temperature readings of the refrigerant in a system such as shown in FIG. 1. For very large systems, it is common to use ammonia as a refrigerant. Turning now to FIG. 2, a graph 5 is shown which defines the condensing temperature $T_c$ of ammonia for various head pressures $P_h$. When a refrigeration system is designed, the designer will select an operating point such as A in FIG. 2, which will be the condensing temperature and head pressure at the designed load of the refrigerator for a selected ambient temperature and relative humidity. In this example, the head pressure will be 185 psi and the condensing temperature will be approximately 96° F. As conditions in the refrigeration system change from the selected design ambient temperature, relative humidity, and refrigeration load, the head pressure and condensing temperature will change accordingly. As long as the refrigeration system is working properly, at maximum efficiency, and within the capabilities of its condensers, these parameters will change according to graph 5. In other words, if conditions were such that the head pressure dropped to 160 psi as at D, the condensing temperature would drop to about 86° F. As previously mentioned, most refrigeration systems provide a readout to the operator of a head pressure $P_h$. Changes of operating conditions from the design point A of a system will always result in changes in the head pressure. Therefore, without additional information the operator cannot interpret whether the change in head pressure is normal or abnormal.

As is well known, certain abnormal conditions will cause the head pressure and the condensing temperature to change from the design point to sets of values which are inconsistent with the original design parameters. For example, if condenser coils 12 become coated with mineral deposit from the water, with dirt or other materials brought in by the air flow, or for any other reason and all other system parameters are at design value, such fouled condensers will reduce the efficiency of the condenser with the result that the condensing temperature $T_c$ will rise along with a change in head pressure $P_h$ as indicated at B in FIG. 2. Here, the head pressure is now about 198 psi and $T_c$ is now about 101° F. An operator depending entirely on monitoring head pressure would have no indication of any abnormal conditions since the head pressure may increase with increased load or ambient or wet bulb temperature. It may also be noted that the condensing temperature $T_c$ will, under the fouled condenser conditions, follow graph 5 along with the head pressure.

When non-condensible gases such as air and oil vapor build up in the refrigeration lines, the compressor must do more work to produce the same cooling capacity. Assuming the initial conditions at point A on curve 5, $P_h$ can rise to, for example, about 202 psi as a C while the condensing temperature remains at 96° F. Again, the operator does not know whether this higher-than-design head pressure is due to the abnormal condition of non-condensibles or to a change in relative humidity or other ambient conditions. As the load on the refrigeration system changes within the limits of the system capacity, $P_h$ will vary along graph 6 while the condensing temperature $T_c$ would vary in accordance with graph 5. It has been found that for each two pounds of head pressure increase due to non-condensibles, a typical system will lose one percent in efficiency. Therefore, the rise indicated at point C would represent about a 7½ percent loss in efficiency. Similarly, a 2° rise in condensing temperature will also produce about a three percent loss in efficiency. As may be readily recognized at this point, it is necessary to have knowledge of both the head pressure $P_h$ and the condensing temperature $T_c$ to determine if there are any abnormalities in the system operation. It is also necessary to know the wet bulb and dry bulb temperatures $T_{wb}$ and $T_{db}$ to determine if changes from the standard operating conditions such as at point A of FIG. 2 are due to change in ambient conditions or to change in load conditions, or to combinations thereof. Normally, the suction pressure $P_s$ will remain relatively constant as the other parameters change.

Figure 3:
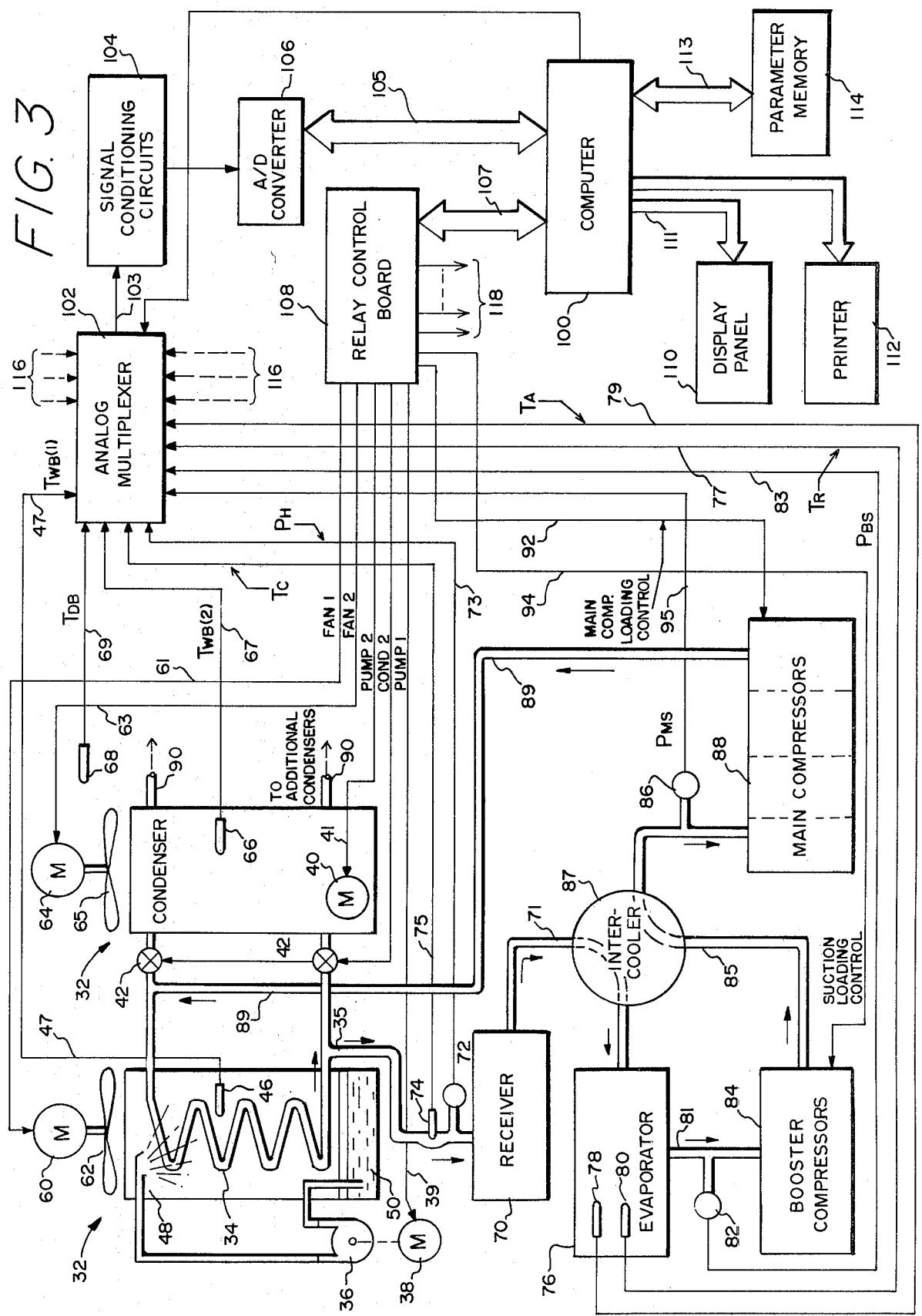
FIG. 3 is a functional block diagram of the energy management system connected to a two stage refrigeration system.

In FIG. 3, I have shown a functional block diagram of a large two-stage refrigeration system having a set of sensors installed therein connected to a functional block diagram of the energy management system of my invention. The refrigeration system is shown having two evaporative condensers 30 and 32 illustrated along with connections for additional condensers. Although modern custom refrigeration designs may now utilize a large single condenser, it is much more common to find a multiple condenser system in present use. For large systems, ammonia is most commonly used as the refrigerant with multiple condensers connected in parallel. Each condenser feeds the liquid refrigerant to a common receiver through traps such that the gas pressure and liquid levels equalize among the condensers. A condenser may be cut out by turning off the fans and pumps to that condenser. With systems using freon, control of condensers may be accomplished by remote control valves 42 as indicated functionally in FIG. 3. Control of the condensers as the loads change minimize operating costs. Such systems are particularly suited for operation by my energy management system since the additional condensers can be controlled automatically when desired. A receiver 70 common to all the condensers is shown which connects via line 71 through intercooler 87 to evaporator 76.

A two stage system as illustrated may be used when very low temperatures are required. For example, the room controlled by evaporator 76 may require a −30° F. temperature. Intercooler 87 is utilized to subcool the refrigerant from receiver 70 down to 18° F., for example. Thus, the refrigerant has a greater capacity for heat absorption in the evaporator 76. For this two stage system, a booster compressor 84 is required which draws the refrigerant from evaporator 76 and may typically raise its pressure from 9 inches of water vacuum to 25 psi at its output on line 85. The temperature of the refrigerant at the input to booster compressor 84 may be on the order of −40° F. for this example and 110° F. at the output. Intercooler 87 operates to remove much of the superheat picked up from the booster compressor such that the refrigerant entering the main compressor may be at about 112° F. at 25 psi. The main compressor 88 then raises the pressure of the refrigerant to, for example, 185 psi in a typical system. The temperature of the gaseous refrigerant may be in the range from 108° F. to 285° F. The compressed gas flows via line 89 to the coil 34 in condenser 30, and to condenser 32 and additional condensers if valves 42 are open. For purposes of discussion, consider that valves 42 are closed and that only condenser 30 is operational. Water from sump 50 is pumped via pump 36 to spray system 48 to maintain condenser coil 34 coated with a film of water on its surfaces. A fan system 62 driven by motor 60 is shown schematically and it is to be understood that each condenser may have multiple fans. Air from fans 62 flows through coils 34 carrying the evaporated water and its latent heat away from the coils, normally to the outside air. Pump 36 is driven by motor 38. I have indicated main compressors 88 representing a number of paralleled compressors which are controlled to cut in and out with variation in load.

To illustrate the operation of my energy management system, I have shown a number of sensors disposed at the appropriate points in the exemplary refrigeration system. It is to be understood that the management system will accommodate additional sensors which may be necessary when multiple compressors and/or multiple condensers are used. Referring to condenser 30 as an example, I dispose a temperature sensor 46 adjacent to condenser coil 34 such that it is maintained with a film of water on the sensor bulb from water spray 48. Thus, the temperature registered by sensor 46 depends upon the relative humidity in the condenser and provides a measure of the wet bulb temperature $T_{wb(1)}$. Similarly, condenser 32 includes a wet bulb sensor 66 producing $T_{wb(2)}$. Another temperature sensor 68 is mounted outside of condenser 30 and 32 to obtain a measure of the ambient air temperature noted as $T_{db}$ or dry bulb temperature. Each of these sensors, which are electrical, connects to multiplexer 102 connected to signal conditioning circuits 104 which provide circuits that develop an analog voltage proportional to the temperature of each of the connected temperature sensors. Amplifiers are included to produce the desired range of analog voltages as will be described below.

Sensor 74 is installed in line 35 from the condensers to receiver 70 in contact with the liquid refrigerant flowing therethrough. Its output is connected to signal multiplex circuit 102 via lead 75 and produces a measurement of condenser temperature $T_c$. Temperature sensor 80 is disposed in the evaporator 76 so as to be in contact with the refrigerant flowing through the evaporator. This sensor measures temperature $T_r$ and is connected to signal multiplex circuit 102 by lead 77. Temperature sensor 78 is installed in the air stream flowing through evaporator 76 to measure the air temperature $T_a$ being controlled by the refrigeration system. Sensor 78 is connected to signal multiplex circuit 102 via leads 79.

For this illustrated refrigeration system, pressure measurements on this system are obtained by a set of electrical pressure transducers. Transducer 72, connected to the output line 35 from the condensers, measures the lead pressure $P_h$ and is connected to signal multiplex circuit 102 via leads 73. Transducer 86 measures the suction pressure at the input of main compressor 88 $P_{ms}$ and transducer 82 measures the suction pressure $P_{bs}$ at the input of booster compressor 84. As may be noted, additional inputs 116 to signal multiplex circuit 102 may connect to sensors and transducers in additional condensers and compressors, not shown.

As may now be understood, the signals from the temperature sensors and pressure transducers are multiplexed and conditioned by circuits 102 and 104 to provide a number of analog voltages, each proportional to one of the measured system parameters. Conditioning circuits element 102 is connected via bus 103 to multiplexer 104 which is controlled by microcomputer 100 to scan each of the parameter voltages in a preselected sequence. When a voltage is sensed by circuits 104, it is transferred to analog-to-digital converter 106 which produces a binary number proportional to the original voltage amplitude. The output from A/D converter 106 is connected to microcomputer 100 by bus 105. The microcomputer 100 also is connected via bus 113 to parameter memory 114. All of the pertinent system data for the refrigeration system to be controlled is stored in parameter memory 114 including: the head pressure/condenser temperature relationship for the particular refrigerant used, which is commonly ammonia; the design parameters of wet bulb and dry bulb readings; maximum system capacity; design head pressure and condensing temperature, power consumption of all fan and pump motors in the system; power consumption of main compressors as a function of head pressure and other parameters; cost of power; and other required preselected data such as values of thresholds for alarms and the like.

The microcomputer is programmed to continuously calculate various measures of the operation of the refrigeration system as will be described in more detail below. As will be seen, a number of conditions may exist in which maximum efficiency and therefore minimum energy will be obtained when various pumps and fans are shut down. Therefore, relay control board 108 is provided connected to microcomputer by bus 107. As may be noted from the diagram, relay control board 108 is connected via leads 39 to pump motor 38 for condenser 30 and pump motor 40 via leads 41 for condenser 32. Although not shown, additional condensers would have their respective pump motors connected to relay control circuits as indicated at 118. Leads 61 and 63 control fan motors 60 and 64 respectively.

Relay control circuits 108 are controlled by microcomputer 100 via bus 107 to turn the connected motors off and on. As will be discussed in more detail hereinafter, microcomputer 100, in monitoring the various system operating parameters, will as appropriate determine that system efficiency can be improved by: cutting condensers in and out by means of control valves 42 or other control valves for additional condensers not shown; by cutting fan motors such as 60 and 64 off and on in various condensers; and by cutting water pumps such as 38 and 40 off and on in the various condensers. These control operations which will occur automatically in accordance with my invention will result in changes in certain of the measured system parameters to a more optimum value as determined by the microcomputer from the information stored in parameter memory 114 and the data being received from the refrigeration system. As may now be recognized, my information management system and the refrigeration system cooperate in a closed loop control mode to more nearly optimize operation in accordance with existing conditions of refrigeration system load, condition of the various components, and ambient temperature and humidity conditions.

It is to be understood that the main compressors 88 will include well known mechanisms for controlling the refrigerant volume in accordance with the refrigeration load. However, as will be obvious to those of skill in the art, my energy management system can also monitor the demand on the main compressors 88 and provide the necessary control function. Thus, in a custom design refrigeration system incorporating my energy management system as an integral part thereof, more precise control of the compressors can be provided. For example, leads 92 from relay control circuits 108 control the main compressor loading and leads 94 to booster compressor 84 permits control of intermediate pressure at the input to main compressors 88.

Associated with microcomputer 100 via bus 111 are display panel 110 and printer 112. Display panel 110 provides digital readouts for each function monitored by the various sensors and transducers. This permits the operator to determine at a glance the operating condition of the refrigeration system. Additional readouts, such as the cost per ton per hour for operation of the refrigeration system, are provided with the readout determined by the microcomputer from stored information such as the cost per kilowatt hour for electrical power and calculations based on the readings obtained from the sensors. Display panel 110 also provides visible alarms which will indicate abnormal conditions in this refrigeration system such as fouled condensers and presence of non-condensible gases in the refrigerant lines. The visual alarms may have parallel audible alarms to alert the operator when the problem is noted. Microcomputer 100 will include selected thresholds which, if exceeded, will initiate the alarms. Microcomputer 100 controls printer 112 to print out reports at periodic intervals, which can be selected by the operator, of systems status, system history, and trends of system operation. Such statistical information, not available in prior art systems, can alert the users of the refrigeration system to significant changes in the use of the refrigeration system which might indicate necessity for increasing capacity, adding additional condensers, or due to a reduction in refrigeration capacity needed, a reduction in size of main motors and the like which could permit smaller motors to be substituted with a significant saving in operating costs.

Although not shown in the refrigeration system of FIG. 3, a defrosting system must be provided for evaporator 76 since ice and frost will build up on the coils and reduce the cooling efficiency. In prior art control systems for refrigeration systems, it is common to cycle a defrost system on periodically; for example, the evaporator is operative for 20 minutes, and is then switched to the defrost mode for 2 minutes. However, when a controlled space is operated under high moisture infiltration conditions and under high load, the evaporator can become fouled with frost quickly. The defrost cycle may be too long under such conditions. Conversely, at night and during weekends during which moisture infiltration is minimum, the cycle may be too short.

Figure 4:
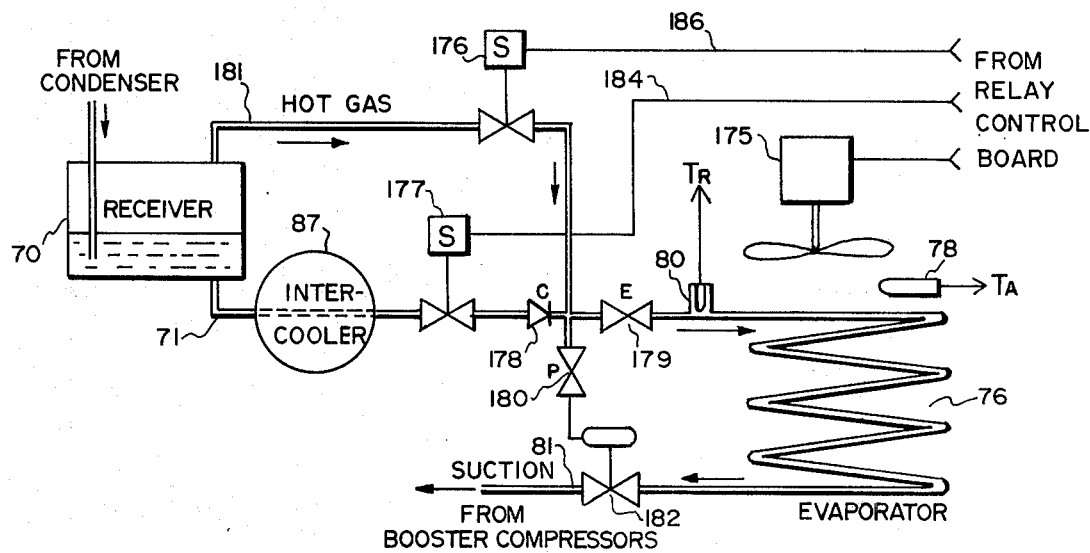
FIG. 4 is a functional diagram of a defrost system for the system of FIG. 2.

Advantageously, my energy management system monitors the evaporator conditions and automatically controls defrosting to occur only when needed. Turning now to FIG. 4, a typical defrost arrangement is shown illustrating my control system based on the difference $\Delta T_e$ between refrigerant temperature $T_r$ and the temperature $T_a$ of the air flowing across the evaporator rather than on a time cycle. In accordance with the refrigeration system design, a maximum $\Delta T_e$ is selected based on the maximum load. For illustration, a $\Delta T_{e(d)}$ of 15° will be assumed from $T_a = -40°$ F. and $T_r = -25°$ F. Thus, under full load conditions, the refrigerant from expansion valve 179 will be flowing through coil 76 at $-40°$ F. as measured by temperature sensor 80 and the air flow from fan 175 will have a temperature of $-25°$ F. as measured by sensor 78. As frost builds up on coil 76, the heat transfer efficiency of evaporator coil 76 will be reduced and the air temperature will rise. For an amount of increase determined experimentally, the defrost system will be activated.

The flow of liquid refrigerant from receiver 70 to evaporator 76 is cut off by solenoid valve 177 via lead 184 from the relay control board of the energy management system. Solenoid valve 176 is opened via lead 186 which permits hot gaseous refrigerant from receiver 70 to flow through coil 76 to quickly melt collected frost. Pilot valve 180 is activated by the hot gas to open valve 182. Fan 175 is turned off during defrost. After defrosting for a predetermined period, the energy management system returns valve 176 to off, valve 177 on, and fan 175 on. Pilot valve 180 will return to off as well as spring valve 182.

The value of $\Delta T_e$ is also utilized to decrease system operating costs under light loads, such as at night and on weekends. For example, if the load is reduced such that $\Delta T_e$ drops to 5° F., evaporator fan 175 can be cut off. For a large refrigeration system, the evaporator fan motors may be 100 Hp. If a 50% fan duty factor on each weekend can be achieved, the reduction in heat load due to fan motors and the reduction in power consumption for a 5¢/kwhr power cost, a savings of over $8,000.00 per year will result.

Figure 5:
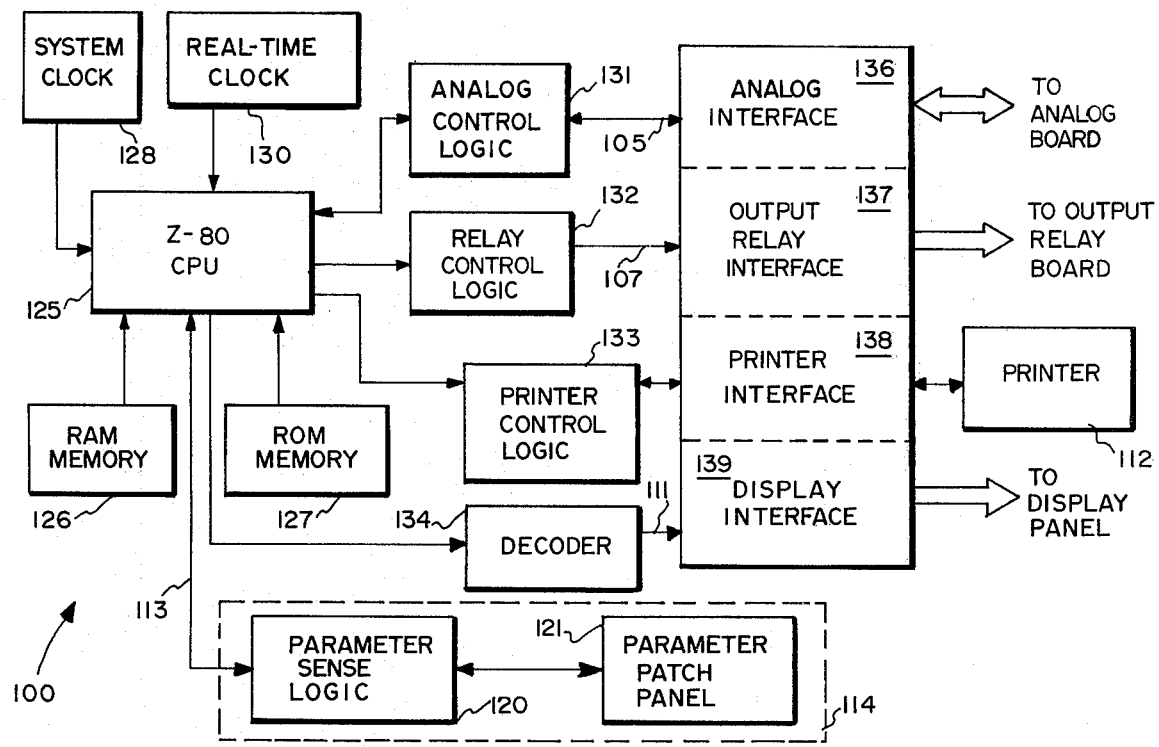
FIG. 5 is a block diagram of the computer board.

Details of the computer controls of my energy management system will now be given with reference to FIGS. 5 through 8 which illustrates the elements thereof, referred to herein as "boards". FIG. 5 is a block diagram of the CPU board 100 which utilizes an 8-bit Z-80 microprocessor 125. System clock 128 produces the basic system bit rate. A real time clock 130 is provided to permit real time preprogramming of the computer system when desired. Random access memory (RAM) 126 supplies 16 K bytes of memory. Programmable read-only memory (ROM) 127 stores the operational program for CPU 125 as well as the various calculation algorithms and similar data. Parameter memory 114 includes parameter sense logic 120 and parameter pitch panel 121. Parameter patch panel 121 is comprised of a multiplicity of 10×10 matrices connected to BCD encoders which may be, for example, 74LS147 integrated circuits. Matrices may be utilized to store installation-specific parameters such as: system capacity; power drain of the drive motors in the refrigeration system; cost of electrical power; and refrigeration system design parameters such as ambient temperature, wet bulb temperature, head pressure, and condensing temperature. The patch panel 121 may be manually programmed at installation and changed when required due to modification of the refrigeration system. Thus, parameter memory 114 supplies CPU 125 with the necessary design data for comparison to operating data for monitoring of the performance of the refrigeration system.

Figure 6:
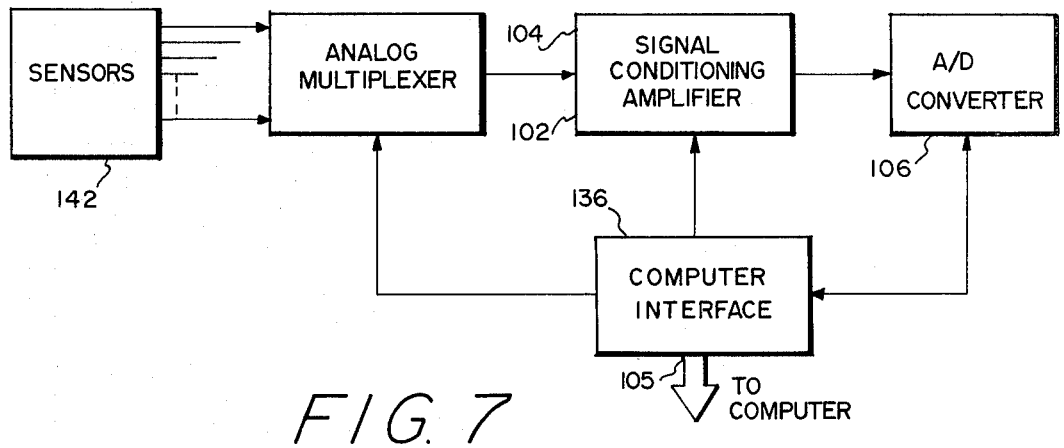
FIG. 6 is a block diagram of the analog signal input board.

The computer board 100 receives its input from the refrigeration system via analog interface 136 and bus 105 from the analog board shown in FIG. 6 in block diagram form. CPU 125 and analog control logic circuits 131 control the multiplexing of the input sensors 142 and the gain of amplifier 141 for each selected sensor. A/D converter 106 in the analog board of FIG. 6 produces binary coded signals as inputs to CPU 125 which utilizes the instantaneous pressure and temperature readings to compute the various system operating parameters.

Figure 8:
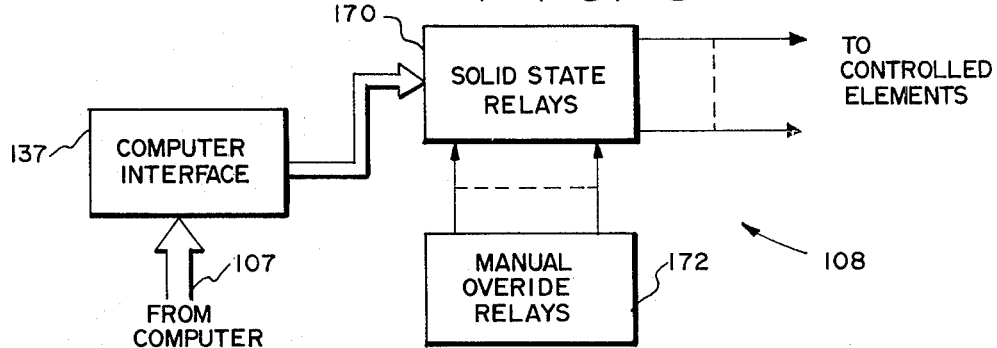
FIG. 8 is a block diagram of the output relay circuit board.

Computer control board 108, shown in block diagram form in FIG. 8, includes a set of solid state relays 170 connected to the refrigeration system to appropriately control each unit in the system as required by computer board 100 so as to maintain maximum operating efficiency of the refrigeration system at all times. A set of conventional electromagnetic relays 172 is provided having their contacts in parallel with the contacts of solid state relays 170. These relays are manually operable by a key-lock switch to override the solid state relays and also will automatically close in case of loss of power to the computer. Actuation of the manual override relays 172 will completely remove the control of the refrigeration system from the energy management system and therefore permit continuing operation of the refrigeration system in case of failure of the energy management system. CPU 125, in its continuous monitoring of the various pressure and temperature information obtained from sensors 142, will operate solid state relays 170 through relay control logic 132 and relay interface 137 to energize and deenergize the appropriate elements in the refrigeration system as indicated by the instantaneous conditions of the refrigeration system to thereby optimize efficiency and minimize operating costs.

Figure 7:
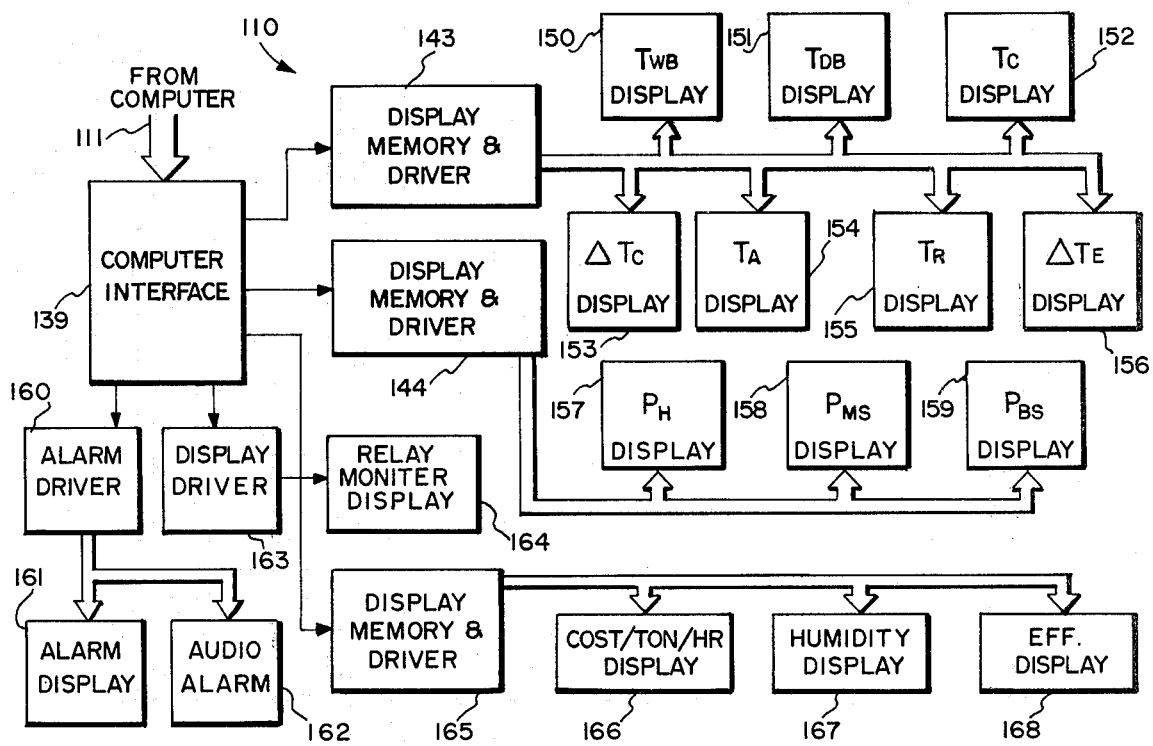
FIG. 7 is a block diagram of the display and alarm board.

Computer board 100 drives display board 110 shown in block diagram form in FIG. 7 via display interface 139 and bus 111. All alphanumeric displays may be 8-digit LED 7-segment types. The temperature displays are controlled by display memory and driver 143 which includes a multiplexer and circuitry to sequentially energize each of the seven temperature displays shown to minimize power consumption. Values of wet bulb temperature, dry bulb temperature, and condensing temperature are indicated by displays 150, 151, and 152, respectively. The conditions in the evaporator are indicated by the air temperature and refrigerant temperature displays 154 and 155, respectively. CPU 125 continuously calculates the difference between the wet bulb temperature and the condensing temperature, $\Delta T_c$, which is shown on display 152. Similarly, $\Delta T_e$ is calculated, which is the difference between temperature $T_a$ and temperature $T_r$, and is indicated by display 156. Display memory and driver 144 multiplexes readings of head pressure, main suction, and booster suction as indicated by displays 157, 158 and 159, respectively.

Display memory and driver 165 operates refrigeration system condition displays 166, 167 and 168 which may be LED bar-type displays. Display 166 provides the operator with the instantaneous cost per ton per hour; display 167 indicates relative humidity; and display 168 indicates the efficiency of the refrigeration system.

Display board 110 also provides system alarms which may be of both visual and audible types. Alarm driver 160 will supply alarm signals to visual alarm display 161 and audible alarm display 162. The status of each of the solid state relays in the relay board FIG. 8 is indicated by a relay monitor display 164 operated via display driver 163 to indicate to the operator which elements of the refrigeration system are energized. Decoder 134 in computer board 100 of FIG. 4 produces the necessary coding from the output of CPU 125 to operate the displays of FIG. 7 via interface 139 and bus 111. In addition to instructing display board 110, CPU 125 controls a data logging printer 112 which may be, for example, an alphanumeric thermal printer to periodically log refrigeration system operating conditions and the various control operations effected. Printer control logic 133 generates the necessary handshake procedures to control printer 112 and is interfaced to the printer via a bit parallel, serial character interface 138.

Turning now to FIG. 6, sensors 142 are disposed at the appropriate point in the refrigeration system and connect to an analog multiplexer 102 and signal conditioning circuits 104. Multiplexer 102 may comprise two dual 8-channel analog multiplexers providing 16 channels of differential inputs. Multiplexers 102 may be types MPC8D and are under the control of the computer board 100 to sequentially select sensors at a scan rate of approximately ten samples per second. Thus, each sensor is sequentially connected by multiplexer 102 to signal conditioning amplifier 104. Under computer control, amplifier 104 will have its gain changed to scale the input parameter to fall within preselected limits. Amplifier 104, which may be a type 3606A, provides low drift, differential amplification and filtering to ensure high common mode and normal mode noise rejection as well as RFI/EMI immunity in harsh environments. The amplified signal from the sensor is directed to A/D converter 106 which may be a 13-bit quad slope unit, type AD7550. A/D converter 106 converts the input signal to an equivalent digital representation between maximum counts of $-4095$ and $+4095$. The digital signals then flow to the computer board 100 via interface 136.

As previously mentioned, deviation of operating parameters of the refrigeration system from design values indicates a drop in efficiency of approximately one percent for each 2 psi of high side pressure deviation or three percent loss for one degree temperature deviation. Therefore, I prefer precision sensors that produce accurate parameter measurements. Pressure transducers such as 72, 82, and 86 of FIG. 3 are preferably Beta pressure cells available from the BLH Company. These units produce a change in resistance with a change in pressure and have a rated output of 3 mV/V with an accuracy of $\pm 0.5\%$. Excitation power to the pressure transducers includes provisions to correct for transducer cable resistance variations. The temperature transducers are preferably current devices, such as the model AC 2626 available from Analog Devices Company. This unit produces an output current linearly proportional to absolute temperature and has an output of 1 ua/deg C. Thus, the temperature inputs are insensitive to the length of the connecting cable. These sensors have an accuracy of $\pm 0.5°$ C.

Figure 9:
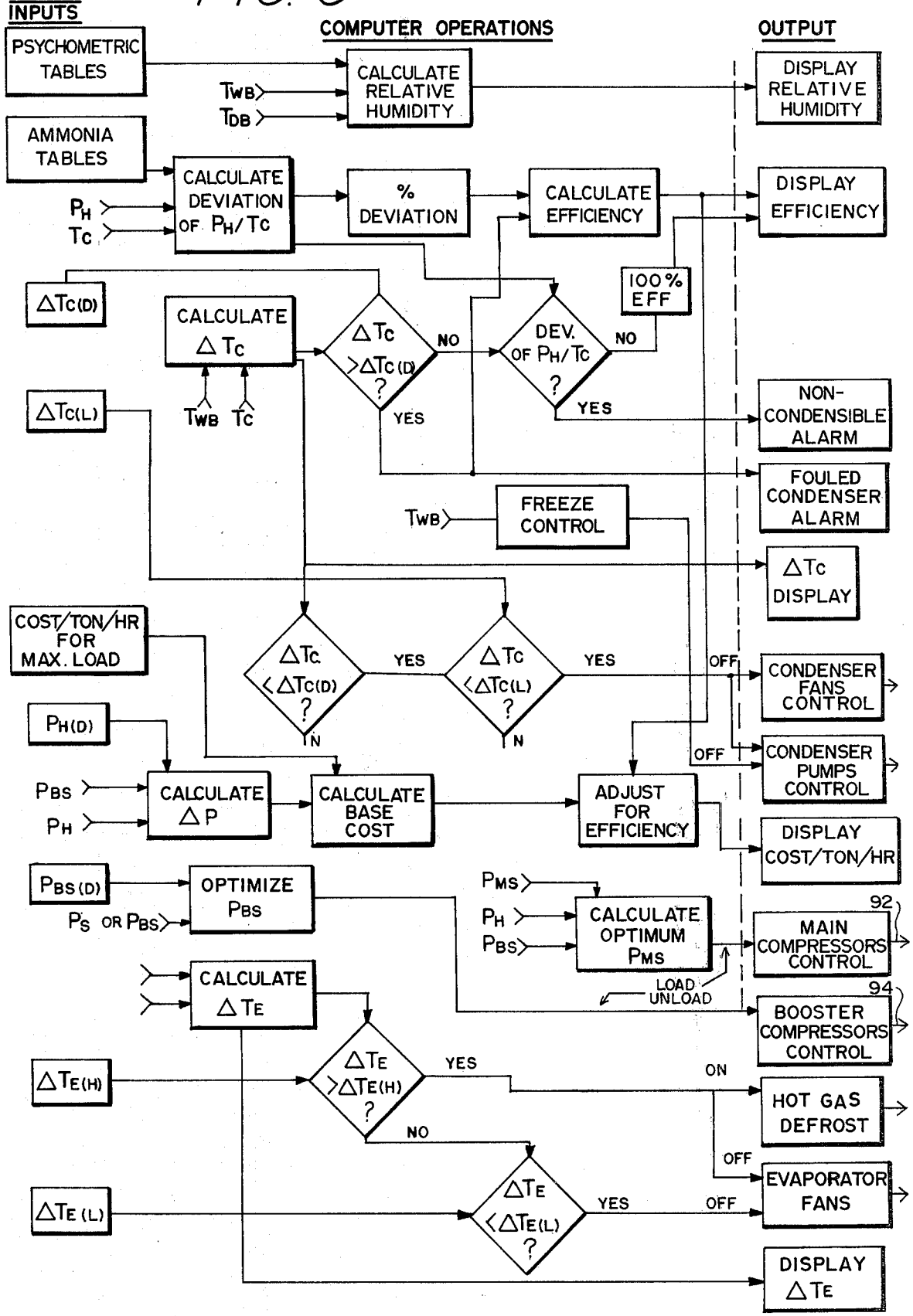
FIG. 9 is a functional flow chart of the computer operation of the energy management system of the invention.

A flow diagram of the various operations and calculations performed by the computer of my energy management system is presented in FIG. 9. Generally, input data stored in parameter memory 114 are indicated in the left hand column of the diagram and the various system output displays and controls are shown in the right hand column. The following are typical calculations performed by the computer from the readings of the various sensors and typical controls and displays which result from the calculations.

1. Relative Humidity

Inputs from wet bulb sensor 46 and dry bulb sensor 68 are processed and compared with psychrometric tables stored in the memory to produce a reading of percent relative humidity which is displayed.

2. System Efficiency

When the refrigeration system is operating such that the head pressure $P_h$ and the condensing temperature $T_c$ are exactly in accordance with the ammonia pressure-condensing temperature tables and that the difference between the wet bulb temperature $T_{wb}$ and condensing temperature $T_c$ is equal to the design value $\Delta T_{c(d)}$, then 100% efficiency is being achieved. To indicate a departure from 100% efficiency, the values of $P_h$ and $T_c$ are compared with the ammonia tables stored in memory to determine if there is a deviation. If a deviation is found, the percentage deviation is calculated and from that a percent efficiency is determined and displayed. However, if condensers are fouled, the system efficiency will be reduced yet the $P_h/T_c$ relationship would show no deviation. Therefore, it is necessary to calculate $\Delta T_c$ from wet bulb temperature $T_{wb}$ and condensing temperature $T_c$. After $\Delta T_c$ is found, it is compared to the design value $\Delta T_{c(d)}$ which is stored in memory. If $\Delta T_c$ is greater, as indicated by the "yes" from the decision step, the increase in $\Delta T_c$ is then utilized to calculate the percent efficiency which is displayed. The change in efficiency due to a change in $\Delta T_c$ is determined with reference to the ammonia tables. It has been found empirically that a change in pressure of one psi will result in a change in efficiency of approximately 0.5%. It may be noted at a typical operating point that a change in pressure of one psi is equivalent to an approximately $1\frac{1}{2}°$ change in $T_c$. This empirical information is thus stored in the computer memory to permit a percentage efficiency to be calculated.

It may be noted that since a reduction in efficiency due to an increase in $\Delta T_c$ is caused by fouled condensers, detection of this condition also energizes the fouled condenser alarm. It should also be noted that fouled condensers could occur simultaneously with a build-up of non-condensibles in the refrigerant. If the calculation of $\Delta T_c$ shows no increase, and there is no deviation in $P_h/T_c$ then neither fouled condensers nor non-condensibles are present, indicating 100% efficiency which will be displayed. However, when a deviation of $P_h/T_c$ is found and the decrease in efficiency noted on the display, this also triggers the non-condensible alarm as indicated. The value of $\Delta T_c$ determined from the above calculation is displayed to provide the operator with a constant indication of this important parameter.

3. Condenser Controls

As previously discussed, $\Delta T_{c(d)}$ is selected at design of the refrigeration system for full load operation. When the system is operated at less then full load, $\Delta T_c$ will decrease due to a reduction in $P_h/T_c$. Thus, the value of $\Delta T_c$ calculated as above is compared to $\Delta T_{c(d)}$ to determine if it is less then design value. If so, this is an indication of reduced load. Generally, the compressors in the system will have internal controls which will reduce the capacity of the compressors proportional to the reduction in load so as to reduce the input power to the compressors. This also has the effect of reducing the cost per ton per hour to operate the compressors. However, the condenser fans and pumps, which may draw 10% of the full load compressor input power, will continue to run and their power drain will become a larger percentage of the total input power drain. As an example, assume a refrigeration system having a maximum design value of 852 tons, a $T_{c(d)}$ of 18°, evaporative refrigerant temperature of $T_r$ of 20° F. and a head pressure $P_h$ of 185 psi. When working at full load, the compressors will draw approximately 946 horsepower which, at 5¢ per kilowatt hour, will have a cost of 4.5¢ per ton or $38.34 per hour. Assume the condenser pumps and fans require 104 horsepower, their cost to operate will be approximately $4.57 per hour. Assume now that the load of the system is reduced from 852 tons to 213 tons. At this point, the compressor power required will drop to 191 horsepower or 3.65¢ per ton per hour for a total cost of $7.77 per hour. However, it will be recognized that the reduction in drain on the compressors does not affect the power required by the condenser pumps and fans and their operating costs will remain at $4.57 per hour.

The compressors operating at 213 tons output will result in a drop in head pressure $P_h$ to 146 psi, dropping the condensing temperatures $T_c$ proportionately and for the same condenser efficiency will result in a $\Delta T_c$ of 5° F. Dropping the load further to 106 tons will reduce the compressor operating costs to $3.73 an hour, $P_h$ to 141 psi and $T_c$ to 3° F. with the condenser fans and pumps still costing $4.57 per hour to run. I have found empirically that a reduction in load which causes $\Delta T_c$ to drop to 3.2° will permit the condenser pumps and fans to be turned off with the resultant rise in $\Delta T_c$ well within the capacity of the condensers. Thus, for lightly loaded conditions, such as may occur during weekends or during long periods in which the control space is at equilibrium, significant savings can result from shutting down the fans and pumps. It should also be noted that changes in relative humidity and ambient air temperature can produce a reduction in $\Delta T_c$ for a given load and in such conditions turning off condenser pumps and fans will result in economies. For systems having multiple condensers, my energy management system will automatically cut out a condenser by turning off fans and pumps progressively as $\Delta T_c$ drops. For very lightly loaded conditions, as in the example above, all of the fans and pumps may be turned off.

As indicated in FIG. 9, the lower $\Delta T_c$ limit which may be, for example 3.2° F., is stored as $\Delta T_{c(l)}$. If the comparison of $\Delta T_c$ to $\Delta T_{c(d)}$ shows a smaller value of $\Delta T_c$, this value is then compared to $\Delta T_{c(l)}$ and if lower, the condenser fans and condenser pumps are turned off. As will be recognized, this is a closed loop system and the calculations and controls described will tend to be cyclic within the limits and delays programmed into the computer. Thus, an optimum savings in power can be achieved without degrading the refrigeration system performance.

4. Cost per ton per hour

It is of interest to the operator to know the cost per ton per hour to operate his compressors. The cost per ton per hour for the compressors operating at maximum design load is determined for a given electrical power rate and stored in memory. Similarly, the design head pressure $P_{h(d)}$ for maximum load is stored. Measurements of head pressure and suction pressure are utilized to determine $\Delta P$, the difference between these two pressure readings. When a drop in load on the refrigeration system occurs, this results in a reduction of operating costs and is reflected by a drop in $\Delta P$. This proportional drop is cost, taken with the stored maximum load cost, provides a reduced cost per ton per hour figure. However, when there is a fouled condenser or non-condensibles, the overall system efficiency is reduced and therefore this number is adjusted upward if necessary. The final cost per ton per hour is read out on the display. It should be noted that the pressure reading $P_s$ for this calculation will be the booster suction pressure in a two-stage system and the main compressor suction in a single stage system.

5. Optimum Intermediate Pressure Control

In a two-stage refrigeration system such as illustrated in FIG. 3, it may be noted that the intermediate pressure, which is referred to here as the main suction pressure $P_{ms}$, will depend upon the loading of booster compressors 84 and main compressors 88. In prior art refrigeration systems, this value is preselected for maximum load conditions. The optimum intermediate suction pressure $P_{ms}$ is calculated by the following equation:

$$P_{ms} = P_{bs}\sqrt{\frac{P_h}{P_{bs}}} \; ;$$

in which all pressure readings are in psi absolute. As may be recognized, when a prior art system operates at less than maximum load, the head pressure $P_h$ will drop with the result that the intermediate suction pressure is no longer optimum. This increases the cost to operate for lighter-than-maximum loads. Advantageously, my energy management system can continuously and automatically control the loading of the booster compressors and main compressors to always maintain the optimum intermediate pressure as the system loads vary from time to time. A design value of the booster suction pressure $P_{bs(d)}$ is selected during design and the value stored in the computer memory. The value of booster suction pressure measured by transducer 82 is continually compared to the design value to operate the booster compressors control so as to maintain booster suction at the design value by loading or unloading booster compressors 84. The measured value of the booster pressure $P_{bs}$ from transducer 82 and of head pressure $P_h$ from transducer 72 is used by the computer to calculate $P_{ms}$ as expressed in the equation above. Suction pressure $P_{ms}$ is monitored by transducer 86 and the main compressors control varies the loading of main compressors 88 to hold the intermediate pressure $P_{ms}$ at the value calculated for the measured head pressure $P_h$. Therefore, a minimum operating cost for the compressors is obtained at all values of system loading.

6. Defrost Cycle

As discussed in detail above, defrosting of evaporator 76 is controlled by the value of $\Delta T_e$ rather than by a timing device as in prior art refrigeration systems. Accordingly, the evaporator air temperature $T_a$ and refrigerant temperature $T_r$ are utilized to calculate $\Delta T_e$. The value of $\Delta T_e$ at any given time is compared to the maximum design $\Delta T_{e(d)}$ to determine if the observed value is greater. If so, this indicates fouling of the evaporator coils from frost. Therefore, the hot gas defrost control initiates a defrost cycle and the evaporator fan is turned off. As may be recognized, a close tolerance can be set on the amount $\Delta T_e$ is allowed to increase above its design value to initiate defrosting, and the evaporator can be defrosted when even a small amount of frost builds up. Thus, the defrost cycle may be very short and is only initiated when required. The same calculation of $\Delta T_e$ may be used to determine when the evaporator is very lightly loaded such that the evaporator fans can be shut down. A low threshold of $\Delta T_{e(d)}$ is selected empirically such that when $\Delta T_e$ drops to that value the evaporator fans are disabled. As $\Delta T_e$ then begins to increase due to the lack of fans to the point at which it exceeds the lower threshold, the fans will be reenergized. The lower $\Delta T_e$ threshold may be selected to produce about a 50% duty cycle for the evaporator fans under light load conditions. The value of $\Delta T_e$ calculated is displayed to inform the operator of the condition of the evaporator.

Although my invention has been disclosed with reference to a one-stage and two stage refrigeration system, it is equally applicable to other systems and applications involving compressors, condensers and evaporators, such as large air conditioning systems, distilling systems, systems employing cooling towers and other in which various controls depend upon the interrelationship of various operating parameters. It will also be obvious to those of skill in this art to make many modifications to the specific means illustrated without departing from the spirit or scope of my invention.

I claim:

1. An energy management system for a single stage refrigeration system having evaporative type condensers comprising:
   A. a plurality of electrical temperature sensors attached to said refrigeration system, said sensors producing electrical signals representative of operating parameters of said refrigeration system including
      a. wet bulb temperature,
      b. dry bulb temperature,
      c. condensing temperature, and
      d. ambient temperature;
   B. a plurality of electrical pressure sensors attached to said refrigeration system, said pressure sensors producing electrical signals representative of operating parameters of said refrigeration system including
      a. head pressure, and
      b. suction pressure;
   C. signal processing circuits connected to said temperature sensors and said pressure sensors for receiving said respective electrical signals therefrom for producing a sequence of binary digital signals representative of said electrical signals;
   D. computer means connected to said signal processing circuits for receiving said sequence of binary digital signals, said computer means having memory means for storing system design parameters, said computer means programmed to periodically calculate other operating parameters of said refrigeration system including
      a. relative humidity,
      b. efficiency of said refrigeration system,
      c. temperature difference between said condensing temperature and said wet bulb temperature,
      d. difference between said head pressure and said suction pressure, and
      e. the cost to operate said refrigeration system;
   E. control relays connected to said computer means for controlling, in said refrigeration system,
      a. condenser fans in response to calculated value of said difference between said condensing temperature and said wet bulb temperature,
      b. condenser pumps responsive to the calculated value of said difference between said condensing temperature and said wet bulb temperature, and
      c. compressor loading responsive to calculated value of said diffference between said head pressure and said suction pressure; and
   F. first alarm means responsive to a deviation of said head pressure relative to said condensing temperature to indicate presence of non-condensible gases in said refrigeration system, and second alarm means responsive to said difference between said condensing temperature and said wet bulb temperature to indicate fouled condensers in said refrigeration system.

2. An energy management system for a double stage refrigeration system having evaporative type condensers, booster compressors, and main compressors, comprising:
   A. a plurality of electrical temperature sensors attached to said refrigeration system, said sensors producing electrical signals representative of the following operating parameters of said refrigeration system,
      a. wet bulb temperature,
      b. dry bulb temperature,
      c. condensing temperature,
      d. evaporator air temperature,
      e. evaporator refrigerant temperature, and
      f. ambient temperature;
   B. a plurality of electrical pressure sensors attached to said refrigeration system, said pressure sensors producing electrical signals representative of the following operating parameters of said refrigeration system
      a. head pressure,
      b. intermediate suction pressure, and
      c. booster suction pressure;
   C. signal processing circuits connected to said temperature sensors and said pressure sensors for receiving said respective electrical signals therefrom for producing a sequence of binary digital signals representative of said respective electrical signals;
   D. computer means connected to said signal processing circuits for receiving said sequence of binary digital signals, said computer means having memory means for storing system design parameters, said computer means programmed to periodically calculate other operating parameters of said refrigeration system
      a. relative humidity,
      b. efficiency of said refrigeration system,
      c. temperature difference between said condensing temperature and said wet bulb temperature,
      d. difference between said head pressure and said booster suction pressure,
      e. the cost to operate said refrigeration system, and
      f. difference between said evaporator air temperature and said evaporator refrigerant temperature;
   E. control relays connected to said computer means for controlling, in said refrigeration system,
      a. condenser fans in response to the calculated value of said difference between said condensing temperature and said wet bulb temperature,
      b. condenser pumps responsive to the calculated value of said difference between said condensing temperature and said wet bulb temperature, and
      c. compressor loading responsive to calculated value of said difference between said head pressure and said booster suction pressure; and
   F. first alarm means responsive to a deviation of said head pressure relative to said condensing temperature to indicate presence of non-condensible gases in said refrigeration system, and second alarm means responsive to said difference between said condensing temperature and said wet bulb temperature to indicate fouled condensers in said refrigeration system.

3. The system as defined in claim 1 or 2 which further comprises display means connected to said computer means for displaying said operating parameters including said other operating parameters.

4. The system as defined in claim 1 or 2 in which said temperature sensors include a resistance element having a change in resistance with temperature.

5. The system as defined in claim 1 or 2 in which said pressure sensors are sources of current in which said current varies with pressure applied to said sensors.

6. The system as defined in claim 1 or 2 in which said signal processing circuits include:
   analog multiplexer for selectively scanning said plurality of electrical sensors;
   programmable gain amplifier connected to said analog multiplexer for sequentially receiving respective electrical signals from said electrical sensors, said amplifier controllable by said computer means to provide scaling of said electrical signals; and
   analog-to-digital converter connected to receive amplified electrical signals from said amplifier and to convert said amplified signals to said sequence of binary digital signals.

7. The system as defined in claim 1 or 2 in which:
   said computer means includes a microprocessor programmed to perform said periodic calculations and to activate said control relays when required responsive to said calculations; and
   said memory means includes random access memory, programmable read only memory, and parameter memory, said parameter memory having a parameter patch panel to permit insertion of system specific data for said refrigeration system, said parameter memory thereby adapted to be modified on occasion.

8. The system as defined in claim 7 in which said computer means further includes printer control logic and external printer for periodically logging refrigeration system operating parameters and controls effected.

9. The system as defined in claim 1 or 2 in which said control relays include override means for manually disabling said control of said relays by said computer.

10. The system as defined in claims 1 or 2 in which said control relays include means for automatically overriding said relays when a failure in said energy management system occurs.

11. The system as defined in claim 1 or 2 in which said first and second alarm means include visual and audible alarms.

12. The system as defined in claim 2 which further comprises evaporator defrosting means responsive to said difference between said evaporator air temperature and said evaporator refrigerant temperature.

13. The system as defined in claim 12 in which the design value of said difference between said evaporator air temperature and said evaporator refrigerant temperature is stored in said memory means, and said evaporator defrost means is activated when said difference between said evaporator air temperature and said evaporator refrigerant temperature is greater than said design difference.

14. The system as defined in claim 13 in which:
   a low threshold difference between said evaporator air temperature and said evaporator refrigerant temperature is stored in said memory means; and
   said control relays include control of the evaporator fans in said referigeration system, said control relays deenergizing said evaporator fans when said calculation of the difference between said evaporator air temperature and said evaporator refrigerant temperature is less than said stored lower threshold difference.

15. The system as defined in claim 2 in which:
   said control relays control loading and unloading of the main compressors in said refrigeration system; and
   said computer means is programmed to periodically calculate an optimum value of said intermediate pressure from said sequences of binary digital signals representative of said head pressure and said booster suction pressure, said computer thereby controlling the loading of said main compressors to produce said optimum intermediate pressure.

16. The system as defined in claim 15 in which said calculation of optimum value is in accordance with the relationship that the absolute value of said optimum intermediate pressure is the absolute booster suction pressure multiplied by the square root of the quotient of the absolute head pressure and the absolute suction pressure.

17. The system as defined in claim 1 or 2 in which said control relays deenergize said condenser pumps when said wet bulb temperature signals indicate freezing conditions in said condensers.

18. An energy management system for a refrigeration system or the like having evaporative condensers comprising:
   first temperature sensing means for producing a first signal representative of the web bulb temperature in and around said condensers;
   second temperature sensing means for producing a second signal representative of the condensing temperature of said refrigeration system;
   pressure sensing means for producing a third signal representative of the head pressure of said refrigeration system;
   memory means for storing pressure-temperature data representative of the head pressure/condensing temperature relationship of the refrigerant of said refrigeration system, and a design difference-temperature between the design wet bulb temperature and the design condenser temperature; and
   calculation means connected to said first and second temperature sensing means for receiving said first and second signals, to said pressure sensing means for receiving said third signal and to said memory means, said calculation means for comparing the sensed head pressure and the sensed condensing temperature to said pressure-temperature data in said memory, and for calculating the difference between said sensed wet bulb temperature and said sensed condensing temperature, and for comparing such difference temperature to said design difference-temperature stored in said memory, said calculation memory means thereby determining the efficiency of said refrigeration system.

19. The system as defined in claim 18 which includes display means for displaying the value of such calculated efficiency.

20. The system as defined in claim 18 in which said calculation means initiates an alarm indicating a fouled condenser when such temperature difference is greater than the design difference temperature.

21. The system as defined in claim 18 in which said calculation means initiates a non-condensible gases alarm when the relationship of the sensed values of head pressure and condensing temperature deviate from the relationship indicated in said stored pressure-temperature data.

22. The system as defined in claim 18 in which said first temperature sensing means is a resistance bulb, whose resistance varies with temperature, disposed adjacent to an evaporative condenser in said refrigeration system, and said second temperature sensing means is a resistance bulb, whose resistance varies with temperature, disposed in contact with condensed refrigerant in said refrigeration system.

23. The system as defined in claim 18 in which said pressure sensing means is a pressure transducer producing a current proportional to the pressure thereon, said transducer connected to the refrigerant line between said condensers and the receiver of said refrigeration system.

24. The system as defined in claim 18 in which said calculation means includes means for displaying the calculated difference temperature.

25. The system as defined in claim 18 in which said calculation means controls relay means for deenergizing condenser fans and condenser pumps when the calculated temperature difference is less than a preselected lower value.

26. The system as defined in claim 18 in which said calculation means controls relay means for deenergizing said condenser pumps when the sensed wet bulb temperature indicates a freezing value.

27. In a single stage refrigeration system having evaporate condensers, the method of managing energy in the system to minimize operating costs comprising the steps of:
  storing in a memory the pressure and condensing temperature characteristics of the refrigerant, the design value of the web bulb temperature in the condensers, the design value of condensing temperature, the design value of the head pressure, the design value of the suction pressure, and the cost per ton per hour for maximum load;
  monitoring electrically the operational parameters of dry bulb temperature, web bulb temperature, head pressure, condensing temperature, and suction pressure;
  processing the monitored electrical signals for input to a digital computer;
  periodically calculating in the computer the relationship of the head pressure and the condensing temperature during operation of the refrigeration system;
  comparing such relationship to the stored characteristics of the refrigerant;
  energizing a non-condensible gases alarm when such relationship deviates from the stored relationship;
  calculating in the computer the temperature difference between the condensing temperature and the web bulb temperature;
  comparing such temperature difference to the difference between the stored design condensing temperature and design wet bulb temperature;
  energizing a fouled condenser alarm when such calculated temperature difference is greater than such stored design difference;
  deenergizing condenser fans and condenser pumps when such temperature difference is a selected value less than such stored difference;
  calculating in the computer the pressure difference between the head pressure and the suction pressure;
  comparing such pressure difference to the difference between the stored design head pressure and stored design suction pressure;
  correcting the stored cost per ton per hour for a maximum load when such calculated pressure difference is less than such stored difference; and
  displaying the corrected cost per ton per hour.

28. In a two stage refrigeration system having booster compressors, main compressors, and evaporative condensers, the method of managing energy in the system to minimize operating costs comprising the steps of:
  storing in a memory the pressure and condensing temperature characteristics of the refrigerant, the design value of the wet bulb temperature in the condensers, the design value of condensing temperature, the design value of the head pressure, the design value of the booster suction pressure, the design value of the intermediate suction pressure, and the cost per ton per hour for maximum load;
  monitoring electrically the operational parameters of dry bulb temperature, wet bulb temperature, head pressure, condensing temperature, booster suction pressure, intermediate suction pressure, evaporator air temperature, and evaporator refrigerant temperature;
  processing the monitored electrical signals for input to a digital computer;
  periodically calculating in the computer the relationship of the head pressure and the condensing temperature during operation of the refrigeration system;
  comparing such relationship to the stored characteristics of the refrigerant;
  energizing a non-condensible gases alarm when such relationship deviates from the stored relationship;
  calculating in the computer the temperature difference between the condensing temperature and the wet bulb temperature;
  comparing such temperature difference to the difference between the stored design condensing temperature and design wet bulb temperature;
  energizing a fouled condenser alarm when such calculated temperature difference is greater than such stored design difference;
  deenergizing condenser fans and condenser pumps when such temperature difference is a selected value less than such stored difference;
  calculating in the computer the pressure difference between the head pressure and the booster suction pressure;
  comparing such pressure difference to the difference between the stored design head pressure and stored design booster suction pressure;
  correcting the stored cost per ton per hour for a maximum load when such calculated difference is less than such stored difference; and
  displaying the corrected cost per ton per hour.

29. The method as defined in claim 27 or 28 which further comprises the steps of:
  calculating in the computer the efficiency of the refrigeration system when the relationship of the monitored head pressure and condensing temperature deviate from the stored relationship; and
  displaying the calculated efficiency.

30. The method as defined in claim 27 or 28 which further comprises the steps of:
  storing in the memory a preselected lower threshold of the temperature difference between the condensing temperature and the wet bulb temperature;
  comparing the calculated temperature difference between the condensing temperature and the web bulb temperature with the stored lower threshold temperature difference;

deenergizing condenser fans and condenser pumps when such calculated temperature difference is less than the stored lower threshold temperature difference; and displaying the calculated temperature difference.

31. The method as defined in claim 27 or 28 in which the step of monitoring the wet bulb temperature includes the step of deenergizing condenser pumps when the monitored wet bulb temperature indicates freezing conditions in the condensers.

32. The method as defined in claim 28 which further comprises the steps of:

calculating in the computer from the monitored head pressure and the monitored booster suction pressure the optimum value of the intermediate suction pressure;

comparing such calculated optimum suction pressure value to the monitored intermediate suction pressure value; and controlling the loading on the main compressors when the monitored intermediate suction pressure is not equal to the calculated optimum intermediate suction pressure to thereby optimize the intermediate suction pressure.

33. The method as defined in claim 28 which further comprises the steps of:

comparing the monitored booster suction pressure to the stored design value of booster suction pressure; and controlling the loading of the booster compressors when the monitored value of booster suction pressure is not equal to the stored design value thereof to thereby optimize the booster suction pressure.

34. The method as defined in claim 28 which further comprises the steps of:

storing in the memory a design value of the difference between the evaporator air temperature and the evaporator refrigerant temperature;

periodically calculating in the computer the temperature difference between the monitored evaporator air temperature and the monitored evaporator refrigerant temperature;

comparing such evaporator temperature difference to the stored design evaporator temperature difference; and deenergizing the evaporator fans and initiating a defrost cycle in the evaporator when the evaporator temperature difference is greater than the stored design evaporator temperature difference.

35. The method as defined in claim 34 which further comprises the steps of:

storing in the memory a predetermined lower limit of the difference between the evaporator air temperature and the evaporator refrigerant temperature;

deenergizing the evaporator fans when the calculated evaporator temperature difference is less than the stored lower limit of the evaporator temperature difference; and displaying the calculated evaporator temperature difference.

* * * * *